(12) United States Patent
Maples et al.

(10) Patent No.: US 7,382,689 B2
(45) Date of Patent: Jun. 3, 2008

(54) FLEXIBLE HYDROPHONE

(75) Inventors: Michael L. Maples, Houston, TX (US); James Spackman, Buchanan Dam, TX (US); Curtis Woods Belknap, Houston, TX (US); Paul Daniel Wentzler, Houston, TX (US); Robert Eric Foertsch, Katy, TX (US)

(73) Assignee: Sercel, Inc., Houston, TX (US)

( * ) Notice: Subject to any disclaimer, the term of this patent is extended or adjusted under 35 U.S.C. 154(b) by 160 days.

(21) Appl. No.: 11/161,640

(22) Filed: Aug. 10, 2005

(65) Prior Publication Data

US 2007/0036033 A1    Feb. 15, 2007

(51) Int. Cl.
*G01V 1/20* (2006.01)

(52) U.S. Cl. .................. 367/165; 367/154; 367/173; 367/20

(58) Field of Classification Search .......... 367/20, 367/154, 165, 149, 173, 188; 174/101.5
See application file for complete search history.

(56) References Cited

U.S. PATENT DOCUMENTS

| | | | | |
|---|---|---|---|---|
| 2,465,696 A | | 3/1949 | Paslay | 367/23 |
| 5,257,243 A | * | 10/1993 | DeChico et al. | 367/169 |
| 5,363,342 A | | 11/1994 | Layton et al. | 367/149 |
| 5,600,608 A | | 2/1997 | Weiss et al. | 367/20 |
| 5,745,436 A | * | 4/1998 | Bittleston | 367/20 |
| 6,128,251 A | | 10/2000 | Erath et al. | 367/154 |
| 6,151,277 A | | 11/2000 | Erath et al. | 367/173 |
| 6,292,436 B1 | | 9/2001 | Rau et al. | 367/149 |
| 6,483,775 B1 | | 11/2002 | Spackman et al. | 367/19 |
| 6,614,723 B2 | | 9/2003 | Pearce et al. | 367/154 |
| 6,853,604 B2 | | 2/2005 | Spackman et al. | 367/154 |

* cited by examiner

*Primary Examiner*—Ian J Lobo
(74) *Attorney, Agent, or Firm*—Law Office of Tim Cook P.C.

(57) ABSTRACT

A hydrophone includes a body formed of a flexible, plastic material. The body includes a plurality of channels and each channel may have one or more wells. The wells are adapted to receive an active element which includes mounting hardware. The mounting hardware includes a soft, rubber grommet or other means which suspends the active element, thereby permitting the flexing of the body without introducing that motion to the active element.

23 Claims, 5 Drawing Sheets

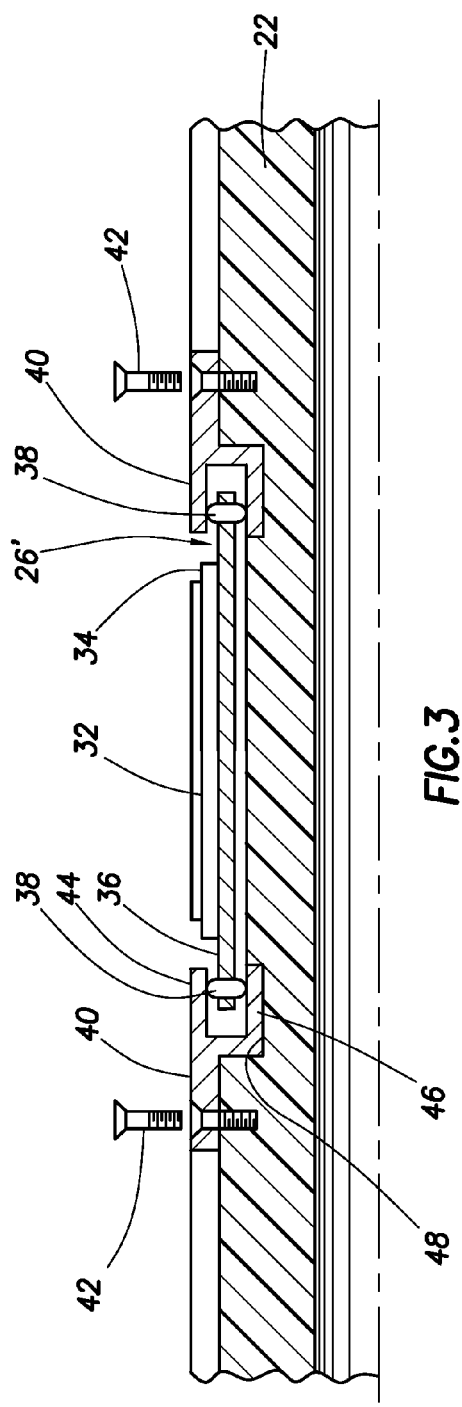
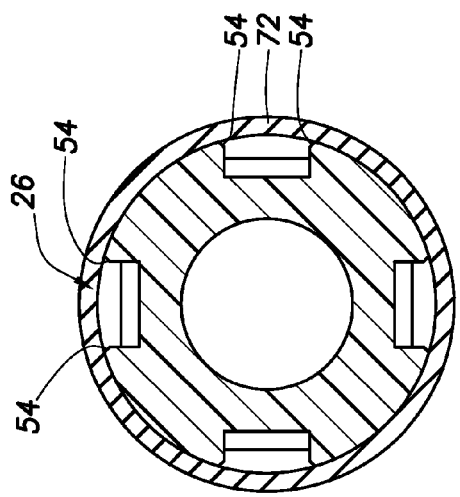
FIG.3
FIG.4

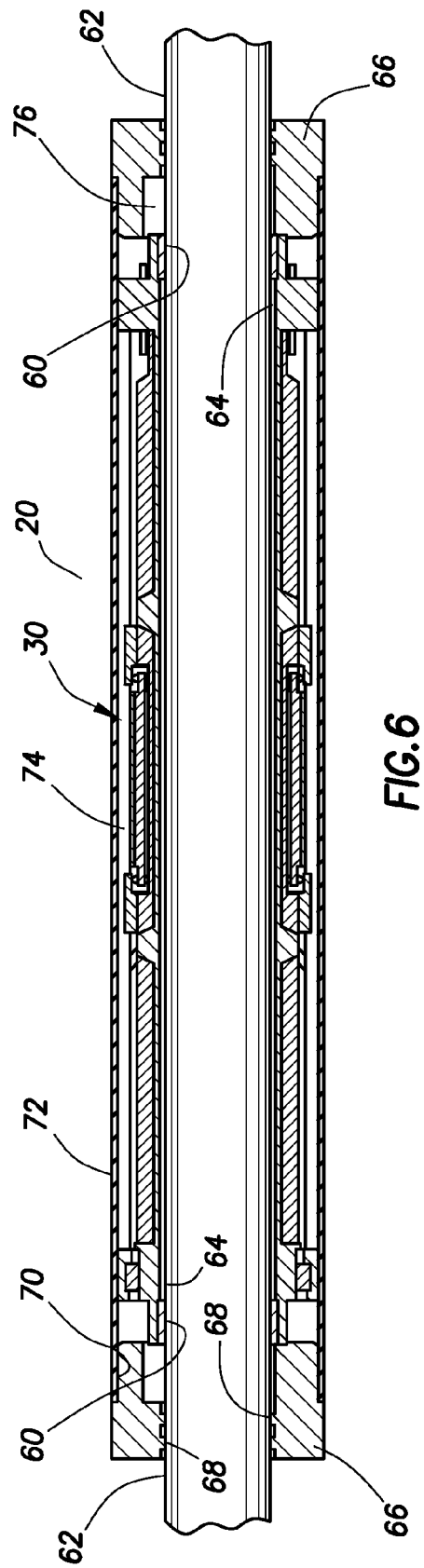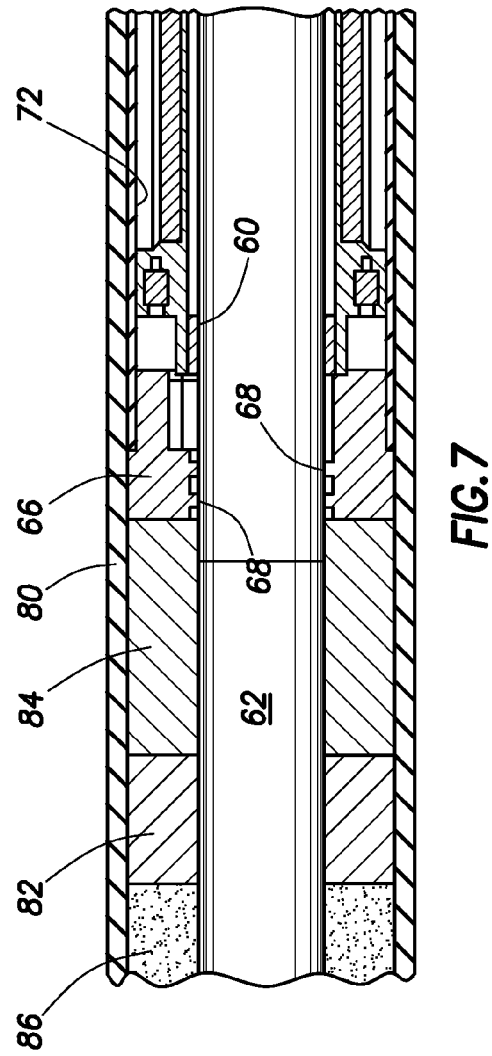
FIG.6
FIG.7

FLEXIBLE HYDROPHONE

FIELD OF THE INVENTION

The present invention relates generally to the field of seismic streamers which are towed through water behind vessels for seismic exploration, and, more particularly, to the field of non-fluid filled seismic streamers. Even more particularly, the present invention relates to a hydrophone comprising a hydrophone body which retains a plurality of active elements, wherein the body of the hydrophone is formed of a pliable or flexible material.

BACKGROUND OF THE INVENTION

In modern marine seismic streamer systems, a vessel tows a long cable supporting a large number of sensors. Recent developments in such systems have simultaneously focused on making such cables light, durable, and easy to manufacture and maintain, as well as sensitive to the acoustic signals of interest while remaining relatively immune to noise. These developments lead to improvements disclosed in U.S. Pat. No. 6,128,251, assigned to the same assignee as the present invention.

In U.S. Pat. No. 6,128,251, there was disclosed a structure of a solid marine seismic cable which included an interior cable, a surrounding woven strength member, an overlying foam floatation layer, and an enclosing jacket. One or more elongate channels were formed in the overlying floatation layer, and one or more piezoelectric elements were mounted in the channel(s). The elongate form of the channel enlarges the acoustic aperture for improved reception of seismic signals.

Further testing of the structure disclosed in that patent proved the efficacy of the structure disclosed therein, and has resulted in certain improvements and refinements, which are the focus of the present application. Many drawbacks then known in the art were solved by the structure disclosed in U.S. Pat. No. 6,853,604, incorporated herein by reference. However, the improvements and refinements have continued.

More particularly, we have found that previous solid marine seismic cables suffer extreme stresses at the ends of the hydrophone body when the cables are reeled onto a cable reel aboard a vessel. This is due in large part to the fact that the body is rigid and the cable forms a sharp bend at each end of the body when it is wrapped around the reel. These extreme stresses have been found to result in premature failure of the cables. The present invention is directed to solving these and other drawbacks in the art.

SUMMARY OF THE INVENTION

The present invention addresses these and other shortcomings in the art of solid marine seismic streamers by providing a hydrophone whose body is formed of a flexible, plastic material. As used herein, the term "flexible" means a material that, when formed as described herein, bends to conform to the radius of curvature of a cable reel aboard a vessel conducting seismic operations at sea.

However, in developing the new flexible hydrophone, a number of new problems have been noted. These new problems involved strain isolation of the active elements of the hydrophone from the strength members of the cable, and isolation of noise from both the streamer and surrounding environment of the cable.

The present invention addresses these and other problems in the art by providing at least three levels of strain and motion isolation from the flexible hydrophone body which retains the sensor element. The first such level of strain and motion isolation relates to the mounting of the active element on the hydrophone body.

The flexible hydrophone includes a plurality of channels, preferably four such channels, with one or more active elements in each channel. The channels are adapted to receive active elements which are mounted upon mounting hardware. The mounting hardware may include a soft, rubber grommet which suspends the active element, thereby permitting the flexing of the hydrophone without introducing that motion to the active element. The grommet also eliminates extensional waves and transverse waves from the body to the active element. Instead of a grommet, an open-ended boot or a self-molded mounting flange may be provided on the mount for the active element on which to suspend the active element in the channel.

The flexible hydrophone of the present invention also includes open cell foam within the channels in order to reduce sloshing of a fluid which is used to fill the channels. Sloshing of the fluid within the channel tends to create an additional noise component that may be received by the active elements. Finally, the active element is precisely positioned at a center point in the channel so that the active element resides at a null point for axial pressure waves within the hydrophone channel.

The second level of isolation relates to isolating the hydrophone body from the cable. The flexible hydrophone body is separated from the underlying cable by a space which is filled with a closed cell foam. The body also rides on a soft seal ring to further dampen vibration from the cable to the body. Finally, a plug is positioned at each end of the body to maintain the radial and axial position of the body, and the plug has a pair of integrally formed ribs to maintain minimal contact area between the cable and the body.

The third level of isolation of the active elements from strain and noise relates to the carrying of noise from the flotation foam and the outer jacket of the streamer into the active element. An anchor is molded to the cable and split ring is movably attached to the cable between the anchor and the body. The outer surface of the split ring is not bonded to the inner surface of the jacket. The anchor and the soft split ring act such that noise and vibration from the flotation foam and the outer jacket are absorbed, and do not substantially pass on to the flexible body or to the active elements.

These and other features, objects, and advantages of the present invention will be readily apparent to those of skill in the art from a review of the following detailed description along with the accompanying drawing figures.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 3 is a side section detail view of a portion of a hydrophone body, depicting the mounting of an active element in the body.

FIG. 4 is an end section view of a body at a well in which an active element is mounted.

FIG. 5A is a perspective view of an assembled view of a hydrophone, while FIG. 5B is a perspective, exploded view of the hydrophone, illustrating a strain isolation feature of the invention.

FIG. 6 is a side section view of the body, illustrating the elements of the hydrophone assembled onto a streamer cable.

FIG. 7 is a detail section view of the region of the streamer between the flotation foam and the flexible body.

DETAILED DESCRIPTION OF A PREFERRED EMBODIMENT

Figure 1:
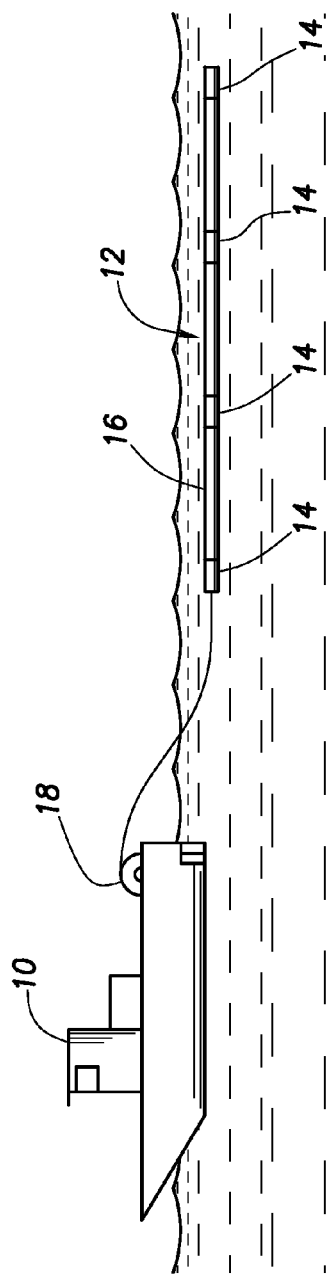
FIG. 1 is an overall schematic of a marine seismic system wherein the present invention may find application.

FIG. 1 depicts a schematic of a basic marine system including a vessel 10 towing a streamer 12. The streamer has a number of pieces of auxiliary equipment, such as depth control devices, associated with it that are not shown in order to simplify FIG. 1.

The streamer 12 also includes a number of hydrophones 14 spaced apart along the streamer. As used herein, the term "hydrophone" refers to the active elements which are sensitive to the seismic signals and the supporting body (or structure) which retains the active elements. Active elements typically comprise piezoelectric elements, but may also include optical elements, micro-machined electro-mechanical sensor elements, and the like.

The hydrophones 14 and a buoyant material are sealed within an outer jacket 16, preferably made of polyurethane, to present a smooth profile, thereby minimizing flow noise. During seismic operations, the streamer 12 is deployed from a cable reel 18 and, once operations are complete, the streamer 12 is reeled back onto the cable reel 18.

In the art, each hydrophone 14 typically includes a body to support the active elements and the body is made of a rigid material, such as aluminum or hard, glass-stiffened plastic. Thus, the body cannot bend when the cable is reeled onto a cable reel aboard a vessel and large stresses are imposed on the cable at either end of the hydrophone 14. The present invention solves this problem in the art by providing a plastic, flexible hydrophone body. However, because the hydrophone body is made of a plastic, flexible material, certain noise effects become significant.

Figure 2:
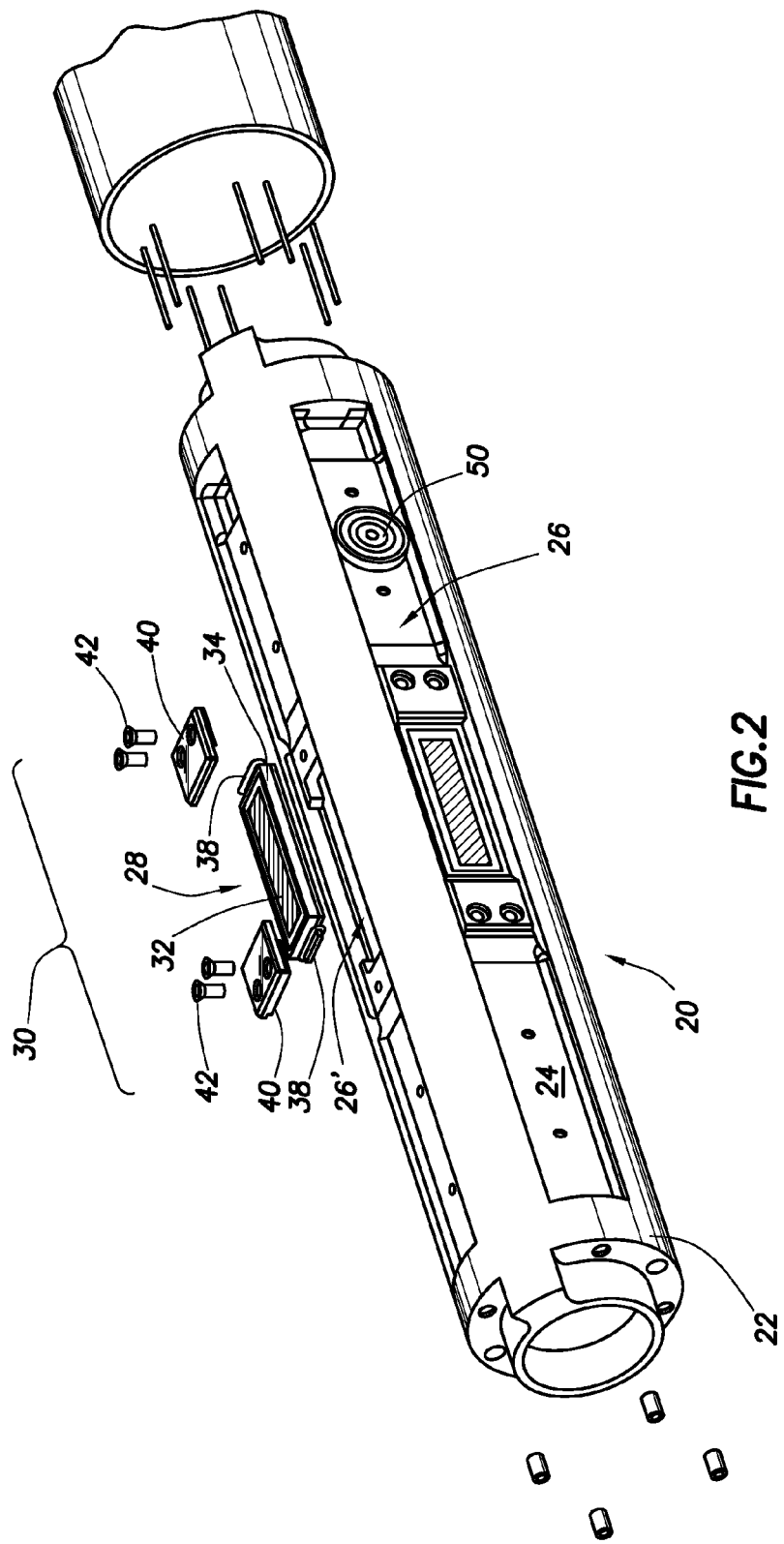
FIG. 2 is a perspective view of the flexible hydrophone of the present invention.

The flexible hydrophone 20 of this invention is depicted in FIG. 2 (corresponding to the hydrophone 14 of FIG. 1). The hydrophone 20 preferably comprises a molded plastic body 22, although other techniques of forming the body may be used. The body 22 includes a plurality of axially oriented channels 24, and each channel may define one or more wells 26. A well 26', which is the center-most of the wells 26, retains an active element 28 suspended therein. Thus, as shown in FIG. 2, the hydrophone 20 preferably includes four axially oriented channels. Preferably, one well 26' is provided, centrally positioned along the channel, although more wells 26 may be provided if desired. Further, an active element 28 is radially positioned at each of the four quadrants and the active element is precisely centrally positioned on the body 22.

Referring now to FIG. 2 and FIG. 3, mounted within the well 26' is an active element mounting assembly 30. The active element mounting assembly 30 may comprise a piezoelectric material 32 glued to an enclosed, six-sided, hollow box 34, in a manner like that shown and described in U.S. Pat. No. 6,853,604, described above. The active element may also comprise an optical element (see for example FIG. 8); a micro-machined, electro-mechanical transducer as shown and described in U.S. Pat. No. 5,956,292; or other means which is responsive to a seismic signal. Further, the active element mounting plate may serve as the ton of the box 34.

The box 34 is in turn mounted upon a mounting plate 36, seen best in FIG. 3. A soft, rubber grommet 38 is removably placed near each end of the plate 36. In place of the grommet, an open-ended boot or a self molded flange near the end of the plate 36 may be used to the same effect. Whether a grommet as shown in FIG. 3 or the other means, the present invention provides a "non-rigid" mounting for the active element which isolates the active element from strain and vibration in the hydrophone body. As used herein, the term "non-rigid" refers to the fact that the active element is permitted to move relative to the body (i.e. is not rigidly attached) yet is still mounted (in contrast to known elements which are permitted to float within a fluid volume). Thus, a feature of the present invention resides in the fact that the active element is supported on a relatively thick, rigid plate 36 which is flexibly held by the grommet or other support, so that vibration and noise caused by the flexing of the streamer cable is not carried through the mount to the active element.

The grommet fits within the jaws of a mounting bracket 40 at each end of the active element. A set of screws 42 secure the active element mounting assembly 30 to the body 22. A sleeve 72 is installed (see FIG. 6) and then the entire channel with the active element(s) installed is filled with a fluid or potting material. Preferably, an open cell foam fills the channel on either side of the active element 30 mounting assembly. This feature of the invention reduces the sloshing of the fluid which may create noise applied to the active element.

Note that the mounting bracket 40 includes an upper plate 44 and a lower plate 46, which together define the jaws referred to above which retain the grommet 38. The lower plate 46 rests snuggly within a recess 48 formed in the bottom of the well 26. Note also that the grommet 38 isolates the active element from strain and vibration which is passed along the body, while leaving the active element free to respond to sound signals within the water surrounding the streamer.

The body may also include a depth limiting button 50. As pressure increases on the outside of the cable, the depth limiting button is compressed. At a predetermined depth, the ambient pressure collapses the button 50, thereby shorting the signal conductors of the hydrophone, and the hydrophone will no longer function.

FIG. 4 depicts an end section view of the body through a well 26. As previously described, the body includes four channels, each channel having up to three wells. The entire hydrophone is covered by a hydrophone sleeve 72. However, at the points at which the sleeve 72 meets a channel, we have found that a self-noise phenomenon is present, created by a vibration of the sleeve at the edge of the channel. To eliminate this self-noise, the edge should include a chamfer 54 in every instance. Further, the sleeve is preferably thermally welded to the body between the channels.

Figure 5:
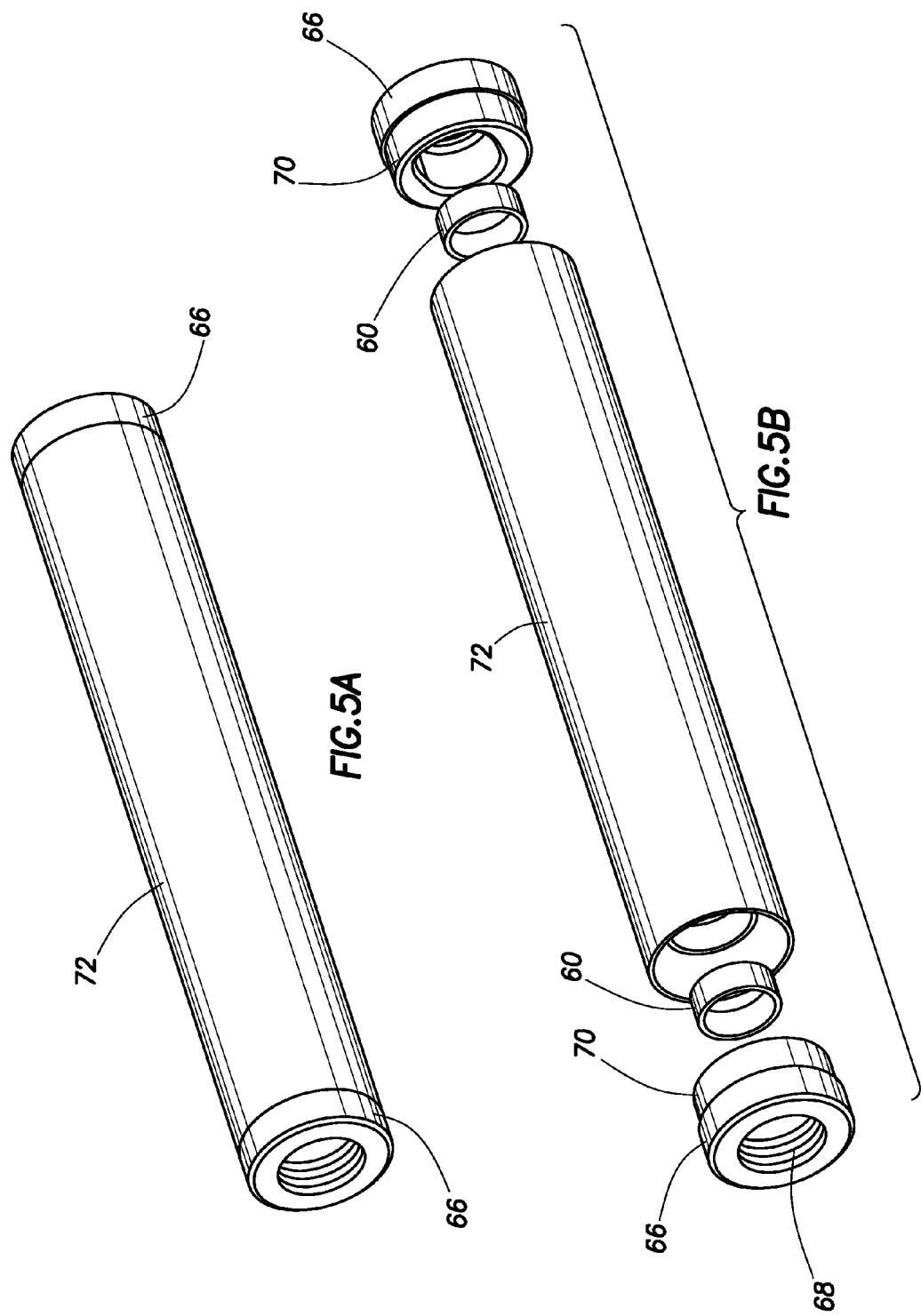

As previously described, the present invention also isolates strain of the streamer cable from the hydrophone elements. This feature of the present invention is best illustrated in FIGS. 5A, 5B, and 6.

FIG. 6 shows a side section view of the hydrophone 20 with an active element 30 mounting assembly mounted therein. The body 22 rides upon a soft and highly pliable seal ring 60 on each end and the seal ring maintains a space 64 between the hydrophone 20 and a cable bundle 62. The space 64 is filled with a soft, dry, closed cell foam to exclude all fluids from the space and to buffer strain and vibration from the cable bundle to the hydrophone body. The closed cell foam may comprise a sheet of foam which is cut to size and wrapped around the cable bundle. Alternatively, the foam in the space 64 may be developed in situ by the injection of the constituent chemicals into the space 64 wherein the reaction occurs to generate the foam.

The cable bundle comprises power and data conductors, one or more strength members, and filler material in a manner well known in the art. The body 22 is also held both radially and longitudinally in place by a pair of thermoplastic rubber plugs 66. The plugs 66 define a pair of annular rings 68 which are in abutting contact with cable bundle 62. This feature provides a solid mounting for the body, while maintaining a minimum contact area for the conduction of vibration and noise from the cable bundle 62 to the body of the hydrophone.

The plugs 66 also define a reduced diameter step 70. The step receives the hydrophone sleeve 72 which encloses the active element mounting assembly 30 within a channel volume 74. This channel volume 74 is, in turn, partially filled with the open cell baffle foam previously described to reduce sloshing of a fluid filling the baffle foam. A splice void 76 is also defined between the end of the body and the plug to provide a region in which to splice the electrical conductors from the hydrophone into the cable bundle 62. The splice void is then filled with a hydrophobic gel to prevent the migration of sea water between the body and the cable bundle in the event of outer jacket damage.

FIG. 7 illustrates another noise isolation feature of the present invention. As previously described, a plug 66 retains the body at a desired radial and axial position relative to the underlying cable bundle 62. A minimal contact area between the plug and the cable bundle is maintained by providing a pair of annular contact rings 68. The plug also supports the end of the hydrophone sleeve 72. The entire arrangement is enclosed with an outer jacket 80, which is the smooth outer surface of the streamer cable.

An anchor 82 is molded to the cable bundle 62 and is rigidly affixed thereto. Furthermore, the outer jacket 80 is bonded to the anchor. A soft split-ring 84 rides on the cable bundle between the anchor and the plug. The split ring is not bonded to the cable bundle or the jacket. Vibrations and axial strain traveling through flotation foam 86 and the outer jacket are reduced by the fixed anchor. The soft split-ring then acts as a vibration absorber further reducing the vibrations and strain that would otherwise pass through to the hydrophone body.

Figure 8:
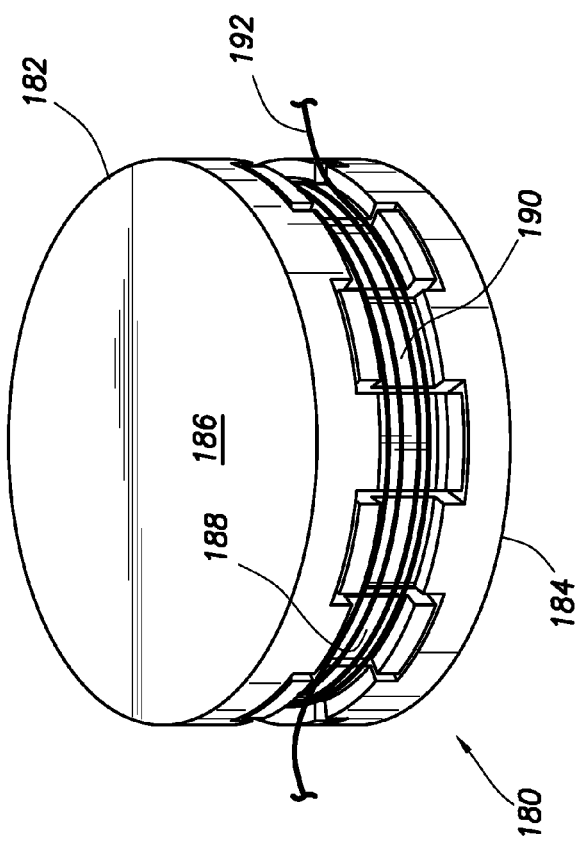
FIG. 8 is a presently preferred embodiment of an optical element which may find application in the hydrophone of this invention.

Finally FIG. 8 depicts a perspective view of a presently preferred optical element 180 which may be used in the active element of the present invention, and which was shown and described in U.S. Pat. No. 6,049,511 and incorporated herein by reference. The optical element includes top diaphragm member 182 and a bottom diaphragm member 184. The top diaphragm member 182 includes a diaphragm 186 and a plurality of tabs 188 which define an annular groove 190 to receive a winding of optical fiber 192.

As the diaphragm 186 flexes down under the influence of a pressure increase, the tabs 188 rotate outwardly, stretching the fiber 192. This action provides mechanical advantage for the lever action, stretching the fiber for a given movement of the diaphragm. Stretching the fiber in this way increases the optical path length of the light through the optical fiber, and this action modulates the seismic signal impressed on the optical element. It should be appreciated that other forms and modes of active elements may be used within the scope and spirit of this invention.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A seismic sensor comprising;
   an axially oriented, flexible plastic body including a plurality of axially oriented channels defining at least one well therein;
   at least one active element supported by the body on a mounting plate having opposing ends, the active element sensitive to a seismic signal, the at least one active element retained within the at least one well;
   a grommet on each of the opposing ends of the mounting plate, and
   a mounting bracket adjacent each end of the mounting plate and grasping the grommet on each end of the plate.

2. The seismic sensor of claim 1, further comprising an active element within each of the plurality of channels.

3. The seismic sensor of claim 1, further comprising a plurality of active elements within each of the plurality of channels.

4. The seismic sensor of claim 3, further comprising an open cell foam in the channel adjacent the active element.

5. The seismic sensor of claim 1, wherein the active element includes:
   a piezoelectric element;
   a hollow box supporting the piezoelectric element; and
   wherein the mounting plate supports the hollow box.

6. The seismic sensor of claim 5, wherein the mounting bracket includes an upper plate and a lower plate to define a set of jaws to grasp the grommet.

7. The seismic sensor of claim 6, further comprising a recess in each well to receive the lower plate of the mounting bracket.

8. The seismic sensor of claim 1, wherein the active element comprises an optical element.

9. The seismic sensor of claim 1, wherein the active element comprises a micro-machined electro-mechanical sensing element.

10. The seismic sensor of claim 1, wherein each of the plurality of channels defines an edge and further comprising a chamfer on the edge.

11. The seismic sensor of claim 1, wherein the body is mounted on a cable, and further comprising a closed cell foam between the body and the cable.

12. The seismic sensor of claim 11, further comprising a plug on each end of the body to maintain radial and axial positioning of the body on the cable.

13. The seismic sensor of claim 12, wherein the plug maintains minimal contact between the body and the cable.

14. The seismic sensor of claim 12, further comprising a seal ring between each end of the body and the cable.

15. A seismic streamer cable having a plurality of seismic sensors positioned therealong at intervals, each of the plurality of seismic sensors comprising a flexible body retaining at least one active element sensitive to a seismic signal, the body including a plurality of axially oriented channels defining at least one well in each of the plurality of channels, the at least one active element retained within the at least one well in its respective channel;

each of the seismic sensors supported by a respective mounting plate having opposing ends; and means for isolating strain from the streamer cable to each of the sensors including a grommet on each of the opposing ends of the respective mounting plate and a mounting bracket adjacent each end of the mounting plate and grasping the grommet on each end of the plate.

16. The streamer of claim 15, further comprising an active element within each of the plurality of channels.

17. The streamer of claim 16, farther comprising an open cell foam in the channel adjacent the active element.

18. The streamer of claim 15, wherein the active element includes a piezoelectric element.

19. The streamer of claim 15, wherein the active element includes an optical element.

20. A seismic sensor on a seismic streamer cable, the seismic sensor comprising an axially oriented, flexible plastic body including a plurality of axially oriented channels defining at least one well in each of the plurality of channels;

at least one active element supported by the body in the at least one well in each of the plurality of channels and sensitive to a seismic signal; and means for isolating strain from the streamer cable to the active element:

wherein each of the active elements is supported by a respective mounting plate having opposing ends; and means for isolating strain from the streamer cable to each of the active elements including a grommet on each of the opposing ends of the respective mounting plate and a mounting bracket adjacent each end of the mounting plate and grasping the grommet on each end of the plate.

21. The seismic sensor of claim 20, wherein the means for isolating strain comprises a non-rigid mount coupling the active element to the body.

22. The seismic sensor of claim 21, wherein the active element comprises a piezoelectric element.

23. The seismic sensor of claim 20, wherein the means for isolating strain comprises a closed cell foam between the body and the cable.

* * * * *